Sept. 3, 1963    H. S. VAN BUREN, JR    3,102,318
WEBBING CLIPS
Filed Dec. 30, 1960
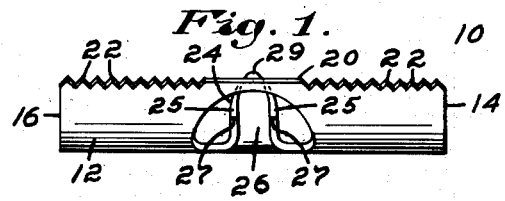
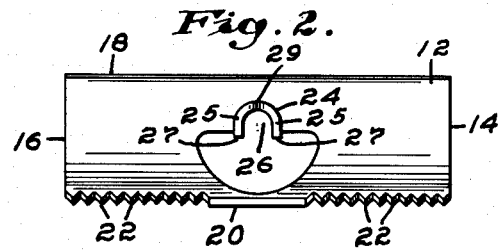
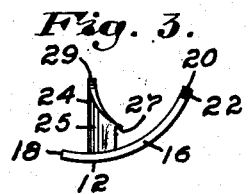
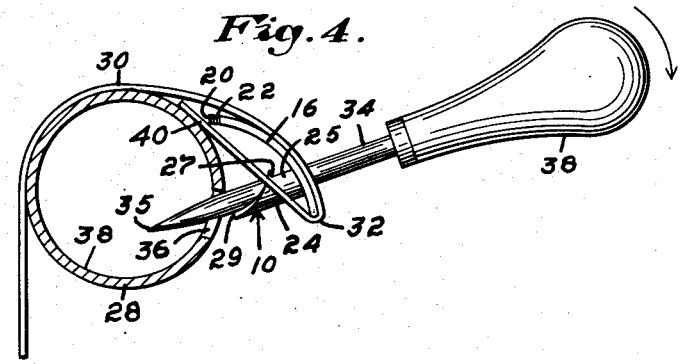
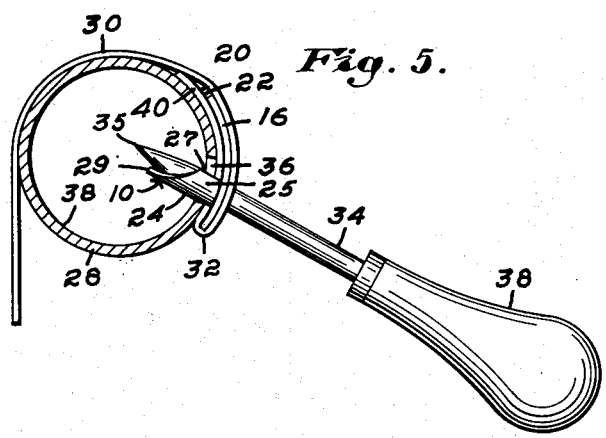
Inventor:
Harold S. vanBuren Jr.
by James B. Tiffany Jr. Atty.

3,102,318
WEBBING CLIPS

Harold S. van Buren, Jr., Cambridge, Mass., assignor to United-Carr Fastener Corporation, Cambridge, Mass., a corporation of Delaware
Filed Dec. 30, 1960, Ser. No. 79,851
1 Claim. (Cl. 24—265)

This invention relates generally to a fastening device and specifically to a fastener clip member adapted to attach webbing or the like to furniture constructed of spaced tubular frame members and a method of assembly.

This invention comprises an improvement in the type of fastener illustrated in the United States Patent No. 2,817,392, issued to M. I. Thomas.

Fasteners of the type heretofore used in securing webbing material to tubular frame members have utilized prong members conforming generally to the curvature of the fastener which generally affect their holding power due to the resilient nature of the webbing material. Further difficulties have been experienced with known fasteners in that they are hand assembled and sufficient tension cannot be established between the frame member and the clip to present a taut appearance. New materials used in the webbing are considerably cheaper and those formed of polypropylene or other materials have a slower elastic memory and after stretching, take a longer period to return to their normal state. Consequently, these fasteners have a tendency to become dislodged from the tubular frame after a period of use.

The object of this invention is to provide a webbing fastener adapted for snap engagement with the tubular frame.

Another object of the invention is to provide a webbing fastener which may be assembled under tension by means of a special tool.

Other objects of the invention will, in part, be obvious, and will, in part, appear hereinafter.

In the drawing:
FIG. 1 is a view in side elevation of the fastener;
FIG. 2 is a top plan view;
FIG. 3 is an end view;
FIG. 4 is a view of the fastener having the webbing folded thereon showing the application by one of a suitable tool; and
FIG. 5 is a view of the fastener snapped into engagement with the tubular member.

Referring to the drawings which illustrate the preferred embodiment of the invention, there is shown a fastener 10 having a preferably curved base portion 12 defining curved end portions 14 and 16 and straight longitudinal edges 18 and 20. One of the longitudinal edges 20 may have serrations 22 formed thereon for a purpose to be described hereafter.

An attaching prong 24 is formed from the medial lateral portion of the base portion 12 and extends inwardly at substantially right angles to the concave side thereof. The prong 24 comprises a pair of walls 25 joined by a bight defining a groove 26 having a shoulder 27 spaced from the base 12 a distance slightly greater than the wall thickness of the tubular member 28. The prong 24 tapers from the shoulder 27 to a sharply pointed end 29 to facilitate penetration through the webbing 30 prior to installation.

To assemble the fastener 10 with the webbing 30 and the tubular frame 28, the webbing 30 is folded around the fastener with the prong 24 piercing through the webbing as shown in FIG. 4. Since one end of the webbing is secured the fold 32 is placed under tension by inserting a suitable tool such as an awl 34 through the exterior fold of the webbing 32 so as to lie within the groove 26 with the point 35 entering into engagement with a round aperture 36 in the tubular frame having a lesser diameter than the distance between the walls 25 of the prong 24. By exerting pressure on the handle of the awl 38 and moving it in the direction of the arrow as shown in FIG. 4, and using the portion adjacent to the point 35 as a fulcrum, the leverage will be sufficient to apply tension to the webbing and carry the prong member 24 into alignment with the aperture 36. The tension exerted by the webbing allows the groove 26 of the prong 24 to slide along the awl so that the prong enters the aperture where the shoulder 27 enters into snap engagement with the inner wall 38 of the frame 28 at the aperture 36.

It will be seen by referring to FIG. 5 that the webbing 30 and fastener 10 are assembled to the tubular frame 28 and the serrated longitudinal edge 20 bears against the inturned portion 40 of the webbing and in turn forces the webbing against the tubular member to minimize slippage therebetween.

It will be obvious to anyone skilled in the art that a fastener embodying the structure set forth will secure webbing or the like in tensioned engagement between pairs of spaced frame members.

Since certain other obvious modifications may be made in this device without departing from the scope of the invention, it is intended that all matter contained herein be interpreted in an illustrative and not in a limiting sense.

I claim:

A webbing clip for attaching a webbing strip to a frame member, said clip having an apertured base plate portion and an attaching prong member having an arcuate wall extending from said base plate portion, said arcuate wall defining the aperture through said base portion and being generally U-shaped, in cross section, to provide said prong member with a lengthwise groove for receiving an attaching tool, said arcuate wall comprising a pair of side walls joined by a bight portion to provide the groove and a frame engaging shoulder on an edge of at least one of said side walls.

References Cited in the file of this patent
UNITED STATES PATENTS

| 2,622,663 | Burd | Dec. 23, 1952 |
| 2,826,245 | Sellner | Mar. 11, 1958 |
| 2,937,696 | Arnold | May 24, 1960 |
| 2,957,219 | Van Buren | Oct. 25, 1960 |
| 2,979,119 | Kramer | Apr. 11, 1961 |
| 3,039,184 | Kramer | June 19, 1962 |
| 3,042,113 | Kramer | July 3, 1962 |

FOREIGN PATENTS

| 678,603 | Great Britain | Sept. 3, 1952 |